US012315411B2

(12) United States Patent
Kim et al.

(10) Patent No.: US 12,315,411 B2
(45) Date of Patent: May 27, 2025

(54) SLEW RATE CONTROL CIRCUIT AND DISPLAY DRIVER IC INCLUDING THE SAME

(71) Applicant: DB GLOBALCHIP CO., LTD., Seongnam-si (KR)

(72) Inventors: Mun Gyu Kim, Bucheon-si (KR); Tae Kyeong Yu, Gimpo-si (KR)

(73) Assignee: DB GLOBALCHIP CO., LTD., Seongnam-si (KR)

( * ) Notice: Subject to any disclaimer, the term of this patent is extended or adjusted under 35 U.S.C. 154(b) by 0 days.

(21) Appl. No.: 18/544,060

(22) Filed: Dec. 18, 2023

(65) Prior Publication Data

US 2024/0379036 A1 Nov. 14, 2024

(30) Foreign Application Priority Data

May 10, 2023 (KR) ........................ 10-2023-0060254

(51) Int. Cl.
*G09G 3/20* (2006.01)

(52) U.S. Cl.
CPC ....... *G09G 3/20* (2013.01); *G09G 2310/0291* (2013.01); *G09G 2330/021* (2013.01)

(58) Field of Classification Search
CPC ............. G09G 3/20; G09G 2310/0291; G09G 2330/021
USPC .......................................................... 345/204
See application file for complete search history.

(56) References Cited

FOREIGN PATENT DOCUMENTS

KR 2022162013 A * 12/2022 ............... G09G 3/20

* cited by examiner

*Primary Examiner* — Mark Edwards
(74) *Attorney, Agent, or Firm* — AEON Law, PLLC; Adam L. K. Philipp; Ki Yong O

(57) ABSTRACT

A display driver integrated circuit comprising an operational amplifier configured to amplify an input voltage and generate an output voltage and a slew rate control circuit configured to generate a compensation current based on a difference between the input voltage and the output voltage and provide the generated compensation current to the operational amplifier, wherein the slew rate control circuit comprises a comparison circuit configured to compare the input voltage and the output voltage and generate a difference current corresponding to a difference between the input voltage and the output voltage, a pull-down circuit comprising a pull-down transistor group and configured to generate a pull-down compensation current by current-mirroring the generated difference current, and a pull-up circuit comprising a pull-up transistor group and configured to generate a pull-up compensation current by current-mirroring the generated difference current is provided.

3 Claims, 8 Drawing Sheets

<A1>

<A2>

SLEW RATE CONTROL CIRCUIT AND DISPLAY DRIVER IC INCLUDING THE SAME

CROSS-REFERENCE TO RELATED APPLICATION

This application claims priority under 35 U.S.C § 119 to Korean Patent Application No. 10-2023-0060254 filed on May 10, 2023, in the Korean Intellectual Property Office, the entire contents of which is hereby incorporated by reference.

TECHNICAL FIELD

The disclosure relates to a slew rate control circuit and a display driver integrated circuit (IC) including the same.

BACKGROUND

The contents set forth in this section merely provide background information on the embodiments and do not constitute prior art.

As the demand for low-power, high-resolution displays is rapidly increasing these days, it is necessary to secure a high slew rate in order to charge display panels in a short time for display driver ICs (DDI).

In this case, there is a method to increase the overall performance by increasing the current consumption of the AMP, which is basically responsible for the source part, to increase the slew rate; however, the increase in current consumption makes it difficult to apply to portable electronic devices or the like that use batteries, and accordingly, it is avoided.

Therefore, there is a sufficient need for a technology capable of improving a slew rate without increasing power consumption, and research on this has continuously been conducted.

The description set forth in the background section should not be assumed to be prior art merely because it is set forth in the background section. The background section may describe aspects or embodiments of the disclosure.

SUMMARY

An aspect of the disclosure is to provide a slew rate control circuit capable of improving a slew rate without increasing current consumption.

Another aspect of the disclosure is to provide a display driver IC capable of improving a slew rate without increasing current consumption.

Aspects of the disclosure are not limited to the objects mentioned above, and other objects and advantages of the disclosure that have not been mentioned can be understood by the following description and will be more clearly understood by the embodiments of the disclosure. Further, it will be readily appreciated that the objects and advantages of the disclosure may be realized by the means set forth in the claims and combinations thereof.

According to an aspect of the disclosure, slew rate control circuit and display driver IC including the same include an operational amplifier configured to amplify an input voltage and generate an output voltage; and a slew rate control circuit configured to generate a compensation current based on a difference between the input voltage and the output voltage and provide the generated compensation current to the operational amplifier, wherein the slew rate control circuit comprises a comparison circuit configured to compare the input voltage and the output voltage and generate a difference current corresponding to a difference between the input voltage and the output voltage: a pull-down circuit comprising a pull-down transistor group and configured to generate a pull-down compensation current by current-mirroring the generated difference current; and a pull-up circuit comprising a pull-up transistor group and configured to generate a pull-up compensation current by current-mirroring the generated difference current, and wherein a first pull-down transistor included in the pull-down transistor group is directly connected to the operational amplifier via a first pull-down output node, and a second pull-down transistor included in the pull-down transistor group and different from the first pull-down transistor is directly connected to the operational amplifier via a second pull-down output node that is different from the first pull-down output node, and a first pull-up transistor included in the pull-up transistor group is directly connected to the operational amplifier via a first pull-up output node, and a second pull-up transistor included in the pull-up transistor group and different from the first pull-up transistor is directly connected to the operational amplifier via a second pull-up output node that is different from the first pull-up output node.

Also, slew rate control circuit and display driver IC including the same include the comparison circuit generates the difference current if the difference between the input voltage and the output voltage is greater than a predetermined threshold, and activates any one of the pull-down circuit and the pull-up circuit via the generated difference current.

Also, slew rate control circuit and display driver IC including the same include the comparison circuit activates the pull-down circuit if the input voltage is greater than the output voltage by the threshold or more, and activates the pull-up circuit if the input voltage is smaller than the output voltage by the threshold or more.

Also, slew rate control circuit and display driver IC including the same include the operational amplifier comprises an upper circuit, a lower circuit, and a connection circuit connecting the upper circuit and the lower circuit.

Also, slew rate control circuit and display driver IC including the same include the upper circuit comprises a first upper current mirror circuit and a second upper current mirror circuit, and is connected to the first pull-up output node and the second pull-up output node, and the lower circuit comprises a first lower current mirror circuit and a second lower current mirror circuit, and is connected to the first pull-down output node and the second pull-down output node.

Also, slew rate control circuit and display driver IC including the same include the first pull-up output node is connected between the first upper current mirror circuit and the second upper current mirror circuit, the second pull-up output node is connected between the second upper current mirror circuit and the connection circuit, the first pull-down output node is connected between the first lower current mirror circuit and the second lower current mirror circuit, and the second pull-down output node is connected between the first lower current mirror circuit and the connection circuit.

Also, slew rate control circuit and display driver IC including the same include a third pull-down transistor included in the pull-down transistor group and different from the first pull-down transistor and the second pull-down transistor is directly connected to the upper circuit of the operational amplifier via a third pull-down output node, and a third pull-up transistor included in the pull-up transistor group and different from the first pull-up transistor and the second pull-up transistor is directly connected to the lower circuit of the operational amplifier via a third pull-up output node.

Also, slew rate control circuit and display driver IC including the same include the third pull-up output node is connected between the first lower current mirror circuit and the second lower current mirror circuit, respectively, and the third pull-down output node is connected to the first upper current mirror circuit and the second upper current mirror circuit, respectively.

Also, slew rate control circuit and display driver IC including the same include the third pull-up output node and the third pull-down output node are connected to the operational amplifier at a location farther apart than the first pull-up output node, the second pull-up output node, the first pull-down output node, and the second pull-down output node based on the slew rate control circuit.

According to another aspect of the disclosure, slew rate control circuit and display driver IC including the same include an operational amplifier configured to amplify an input voltage and generate an output voltage; and a slew rate control circuit configured to generate a compensation current based on a difference between the input voltage and the output voltage and provide the generated compensation current to the operational amplifier, wherein the slew rate control circuit comprises a comparison circuit configured to compare the input voltage and the output voltage and generate a difference current corresponding to a difference between the input voltage and the output voltage: a pull-down circuit comprising a pull-down transistor group and configured to generate a pull-down compensation current by current-mirroring the generated difference current; and a pull-up circuit comprising a pull-up transistor group and configured to generate a pull-up compensation current by current-mirroring the generated difference current, and wherein a drain electrode of a first pull-down transistor included in the pull-down transistor group is connected to a first pull-down output node connected to the operational amplifier, a source electrode is connected to a first pull-down auxiliary node included in the pull-down circuit, and a gate electrode is connected to a second pull-down auxiliary node included in the pull-down circuit, a drain electrode of a second pull-down transistor included in the pull-down transistor group is connected to a second pull-down output node connected to the operational amplifier, a source electrode is connected to the first pull-down auxiliary node, and a gate electrode is connected to the first pull-down transistor, a drain electrode of a first pull-up transistor included in the pull-up transistor group is connected to a first pull-up output node connected to the operational amplifier, a source electrode is connected to a first pull-up auxiliary node included in the pull-up circuit, and a gate electrode is connected to a second pull-up auxiliary node included in the pull-up circuit, and a drain electrode of a second pull-up transistor included in the pull-up transistor group is connected to a second pull-up output node connected to the operational amplifier, a source electrode is connected to the first pull-up auxiliary node, and a gate electrode is connected to the first pull-up transistor.

Also, slew rate control circuit and display driver IC including the same include the operational amplifier comprises an upper circuit, a lower circuit, and a connection circuit connecting the upper circuit and the lower circuit.

Also, slew rate control circuit and display driver IC including the same include the upper circuit comprises a first upper current mirror circuit and a second upper current mirror circuit, and is connected to the first pull-up output node and the second pull-up output node, and the lower circuit comprises a first lower current mirror circuit and a second lower current mirror circuit, and is connected to the first pull-down output node and the second pull-down output node.

Also, slew rate control circuit and display driver IC including the same include the first pull-up output node is connected between the first upper current mirror circuit and the second upper current mirror circuit, the second pull-up output node is connected between the second upper current mirror circuit and the connection circuit, the first pull-down output node is connected between the first lower current mirror circuit and the second lower current mirror circuit, and the second pull-down output node is connected between the first lower current mirror circuit and the connection circuit.

Also, slew rate control circuit and display driver IC including the same include a drain electrode and a gate electrode of a first pull-down sub-transistor included in the pull-down transistor group are connected to the second pull-down auxiliary node, and a source electrode is connected to the first pull-down auxiliary node, and a drain electrode and a gate electrode of a first pull-up sub-transistor included in the pull-up transistor group are connected to the second pull-up auxiliary node, and a source electrode is connected to the first pull-up auxiliary node.

Also, slew rate control circuit and display driver IC including the same include a drain electrode of a second pull-down sub-transistor included in the pull-down transistor group is connected to the second pull-down auxiliary node, a source electrode is connected to a third pull-down auxiliary node, and a gate electrode is connected to a third pull-down transistor, and a drain electrode of a second pull-up sub-transistor included in the pull-up transistor group is connected to the second pull-up auxiliary node, a source electrode is connected to a third pull-up auxiliary node, and a gate electrode is connected to a third pull-up transistor.

Also, slew rate control circuit and display driver IC including the same include a drain electrode of the third pull-down transistor is connected to a third pull-down output node connected to the operational amplifier, a source electrode is connected to the third pull-down auxiliary node, and a gate electrode is connected to the second pull-down sub-transistor, and a drain electrode of the third pull-up transistor is connected to a third pull-up output node connected to the operational amplifier, a source electrode is connected to the third pull-up auxiliary node, and a gate electrode is connected to the second pull-up sub-transistor.

Also, slew rate control circuit and display driver IC including the same include the third pull-up output node is connected to the first lower current mirror circuit and the second lower current mirror circuit, respectively, and the third pull-down output node is connected to the first upper current mirror circuit and the second upper current mirror circuit, respectively.

Also, slew rate control circuit and display driver IC including the same include the third pull-up output node and the third pull-down output node are connected to the operational amplifier at a location farther apart than the first pull-up output node, the second pull-up output node, the first pull-down output node, and the second pull-down output node based on the slew rate control circuit.

According to still another aspect of the disclosure, slew rate control circuit includes a comparison circuit configured to compare an input voltage and an output voltage of an operational amplifier and generate a difference current corresponding to a difference between the input voltage and the output voltage: a pull-down circuit comprising a pull-down transistor group and configured to generate a pull-down compensation current by current-mirroring the generated difference current; and a pull-up circuit comprising a pull-up transistor group and configured to generate a pull-up compensation current by current-mirroring the generated difference current, and wherein a drain electrode of a first pull-down transistor included in the pull-down transistor group is connected to a first pull-down output node connected to the operational amplifier, a source electrode is connected to a first pull-down auxiliary node included in the pull-down circuit, and a gate electrode is connected to a second pull-down auxiliary node included in the pull-down circuit, a drain electrode of a second pull-down transistor included in the pull-down transistor group is connected to a second pull-down output node connected to the operational amplifier, a source electrode is connected to the first pull-down auxiliary node, and a gate electrode is connected to the first pull-down transistor, a drain electrode of a first pull-up transistor included in the pull-up transistor group is connected to a first pull-up output node connected to the operational amplifier, a source electrode is connected to a first pull-up auxiliary node included in the pull-up circuit, and a gate electrode is connected to a second pull-up auxiliary node included in the pull-up circuit, and a drain electrode of a second pull-up transistor included in the pull-up transistor group is connected to a second pull-up output node connected to the operational amplifier, a source electrode is connected to the first pull-up auxiliary node, and a gate electrode is connected to the first pull-up transistor.

Also, slew rate control circuit includes a drain electrode of a third pull-down transistor included in the pull-down transistor group is connected to a third pull-down output node connected to the operational amplifier, and a drain electrode of a third pull-up transistor included in the pull-up transistor group is connected to a third pull-up output node connected to the operational amplifier.

Also, the display driver integrated circuit, wherein the comparison circuit activates the pull-down circuit if the input voltage is greater than the output voltage by the threshold or more, and activates the pull-up circuit if the input voltage is smaller than the output voltage by the threshold or more.

Aspects of the disclosure are not limited to those mentioned above and other aspects and advantages of the disclosure that have not been mentioned can be understood by the following description and will be more clearly understood according to embodiments of the disclosure. In addition, it will be readily understood that the aspects and advantages of the disclosure can be realized by the means and combinations thereof set forth in the claims.

The slew rate control circuit and the display driver IC including the same of the disclosure can secure a high slew rate without increasing current consumption.

Further, the slew rate control circuit and the display driver IC including the same of the disclosure can improve the slew rate and at the same time prevent delays from occurring in the settling operation as the plurality of transistors included in the slew rate control circuit is directly connected to several output nodes included in the operational amplifier.

In addition to the contents described above, specific effects of the disclosure will be described together while describing the following specific details for carrying out the disclosure.

In addition to the foregoing the specific effects of the disclosure will be described together while elucidating the specific details for carrying out the embodiments below.

DETAILED DESCRIPTION OF THE PREFERRED EMBODIMENTS

Figure 1:
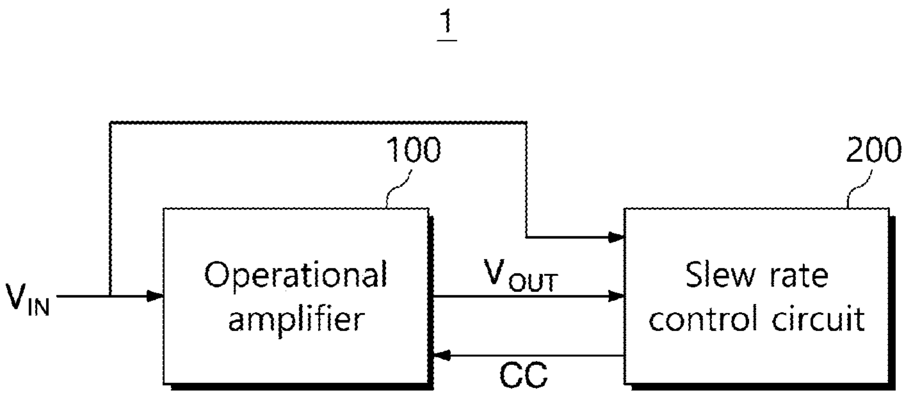
FIG. 1 is a block diagram of a display driver integrated circuit (IC) in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Hereinafter, a slew rate control circuit and a display driver integrated circuit including the same in accordance with an embodiment of the disclosure will be described with reference to FIGS. 1 to 9.

FIG. 1 is a block diagram of a display driver integrated circuit (IC) in accordance with some embodiments of the disclosure.

Referring to FIG. 1, a display driver IC 1 may include an operational amplifier 100 and a slew rate control circuit 200. In this case, the display driver IC 1 may be referred to as the term DDI.

The operational amplifier 100 may generate an output voltage $V_{OUT}$ based on an input voltage $V_{IN}$. The slew rate control circuit 200 may generate a compensation current (hereinafter referred to as "CC") based on the difference between the input voltage $V_{IN}$ and the output voltage $V_{OUT}$ and provide it to a compensation operational amplifier 100.

In other words, the operational amplifier 100 may amplify the input voltage $V_{IN}$ and generate the output voltage $V_{OUT}$, and the slew rate control circuit 200 may generate the compensation current CC based on the difference between the input voltage $V_{IN}$ and the output voltage $V_{OUT}$, and provide the generated compensation current CC to a load stage of the operational amplifier 100.

Through this, the display driver IC 1 can increase the slew rate without increasing current consumption by reducing the transition time of the output voltage $V_{OUT}$.

In general, in order to realize a high slew rate, a method of increasing the overall performance by increasing the current consumption of the AMP, which is basically responsible for the source part, has been commercialized. However, the increase in current consumption makes it difficult to apply to portable electronic devices or the like that use batteries, and accordingly, it is avoided.

To resolve this, the display driver IC 1 of the disclosure can increase the slew rate without increasing current and power consumption by reducing the transition time of the output voltage $V_{OUT}$.

In the following, a detailed configuration of a display driver IC 1 in accordance with some embodiments of the disclosure will be described in more detail with reference to FIG. 2.

Figure 2:
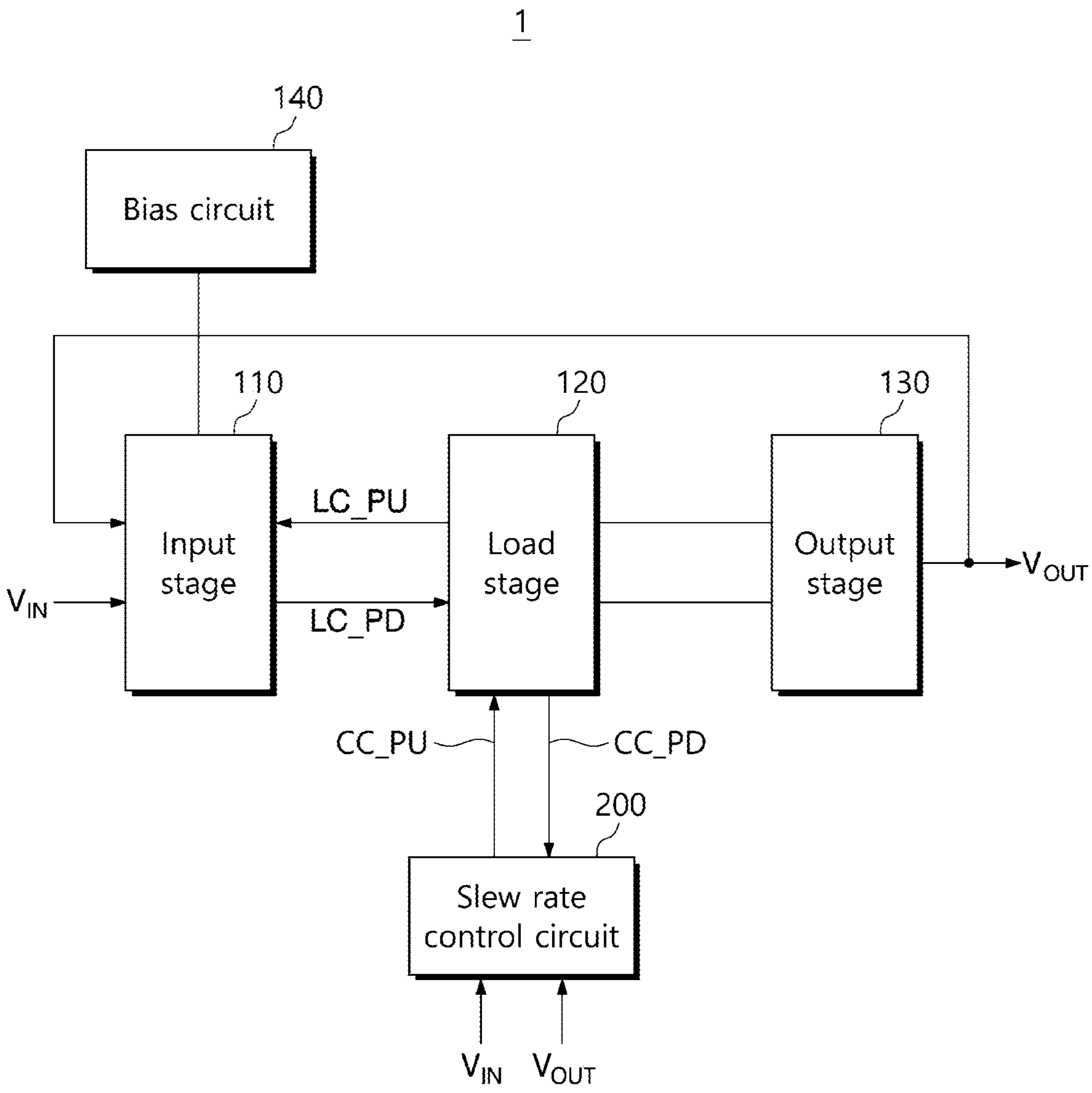
FIG. 2 is a detailed block diagram of a display driver IC in accordance with some embodiments of the disclosure.

FIG. 2 is a detailed block diagram of a display driver IC in accordance with some embodiments of the disclosure.

Referring to FIGS. 1 and 2, the display driver IC 1 may include the operational amplifier 100 and the slew rate control circuit 200 as described above with reference to FIG. 1, and in this case, the operational amplifier 100 may include an input stage 110, a load stage 120, an output stage 130, and a bias circuit 140.

The input stage 110 may receive an input voltage $V_{IN}$ and an output voltage $V_{OUT}$. At this time, the input stage 110 may determine the magnitude difference between the input voltage $V_{IN}$ and the output voltage $V_{OUT}$ that have been received.

The input stage 110 may have a single structure or a dual structure. In other words, the input stage 110 may have a single structure, or a rail-to-rail structure having a dual structure. In this case, if the input stage 110 has a dual structure, the bias circuit 140 may be formed by being separated into an upper bias circuit and a lower bias circuit.

As some examples, the input stage 110 may include a first input stage and a second input stage.

The first input stage may include at least one PMOS transistor. The first input stage may receive a pull-down load current LC_PD from the load stage 120. The second input stage may include at least one NMOS transistor. The second input stage may receive a pull-up load current LC_PU from the load stage 120.

The bias circuit 140 may provide a bias current to the input stage 110. The bias circuit 140 may consist of a single circuit, or may consist of a plurality of circuits divided into an upper bias circuit and a lower bias circuit.

As some examples, the bias circuit 140 may provide a bias current to the input stage 110 based on the bias voltage. At this time, if the bias circuit 140 includes an upper bias circuit and a lower bias circuit, the upper bias circuit may provide a bias current to the first input stage included in the input stage 110, and the lower bias circuit may provide a bias current to the second input stage included in the input stage 110.

The load stage 120 may receive a pull-down compensation current CC_PD and a pull-up compensation current CC_PU, and perform a slew rate compensation operation based on the received pull-down compensation current CC_PD and/or pull-up compensation current CC_PU.

As some examples, the load stage 120 may perform a slew rate compensation operation based on the pull-down compensation current CC_PD and/or the pull-up compensation current CC_PU received from the slew rate control circuit 200, and then, generate a load current (hereinafter referred to as "LC") corresponding to the difference in magnitude between the input voltage $V_{IN}$ and the output voltage $V_{OUT}$ and provide it to the input stage 110.

At this time, the load stage 120 may provide the pull-down load current LC_PD to the input stage 110 if it receives the pull-down compensation current CC_PD, and conversely, may provide the pull-up load current LC_PU to the input stage 110 if it receives the pull-up compensation current CC_PU.

As some examples, the load stage 120 may include an upper circuit, a lower circuit, a connection circuit, a capacitor, and the like.

The upper circuit may include an upper current mirror circuit. The upper current mirror circuit may include PMOS transistors connected in a current mirror form.

The upper circuit may be directly connected to the slew rate control circuit 200 via a pull-up output node and/or a pull-down output node. In other words, the pull-up output node and the pull-down output node may serve to directly connect the pull-up transistor and/or the pull-down transistor included in the slew rate control circuit 200 with the upper circuit.

The upper circuit may be electrically connected to the second input stage included in the input stage 110 and supply current to the load stage 120.

The lower circuit may include a lower current mirror circuit. The lower current mirror circuit may include NMOS transistors connected in a current mirror form.

The lower circuit may be directly connected to the slew rate control circuit 200 via a pull-up output node and/or a pull-down output node. In other words, the pull-up output node and the pull-down output node may serve to directly connect the pull-up transistor and/or the pull-down transistor included in the slew rate control circuit 200 with the lower circuit.

The lower circuit may be electrically connected to the first input stage included in the input stage 110 and supply current to the load stage 120.

The connection circuit may serve to electrically connect the upper circuit and the lower circuit. In this case, the connection circuit may include at least one PMOS transistor and NMOS transistor that operate in response to the bias voltage. At this time, the PMOS transistor and the NMOS transistor included in the connection circuit may operate in response to different bias voltages.

The capacitor may serve to electrically connect the upper circuit and the output stage and/or the lower circuit and the output stage.

As some examples, the load stage 120 may be directly connected to the slew rate control circuit 200 via the pull-down output node and/or the pull-up output node. A detailed description thereof will be given later.

The output stage 130 may be electrically connected to the load stage 120 and may output the output voltage $V_{OUT}$.

As some examples, the output stage 130 may include at least one transistor. At this time, the gate electrode of the PMOS transistor included in the output stage 130 may be connected to the upper circuit of the load stage 120, and the gate electrode of the NMOS transistor included in the output stage 130 may be connected to the lower circuit of the load stage 120.

In the following, the slew rate control circuit 200 will be described in more detail with reference to FIG. 3.

Figure 3:
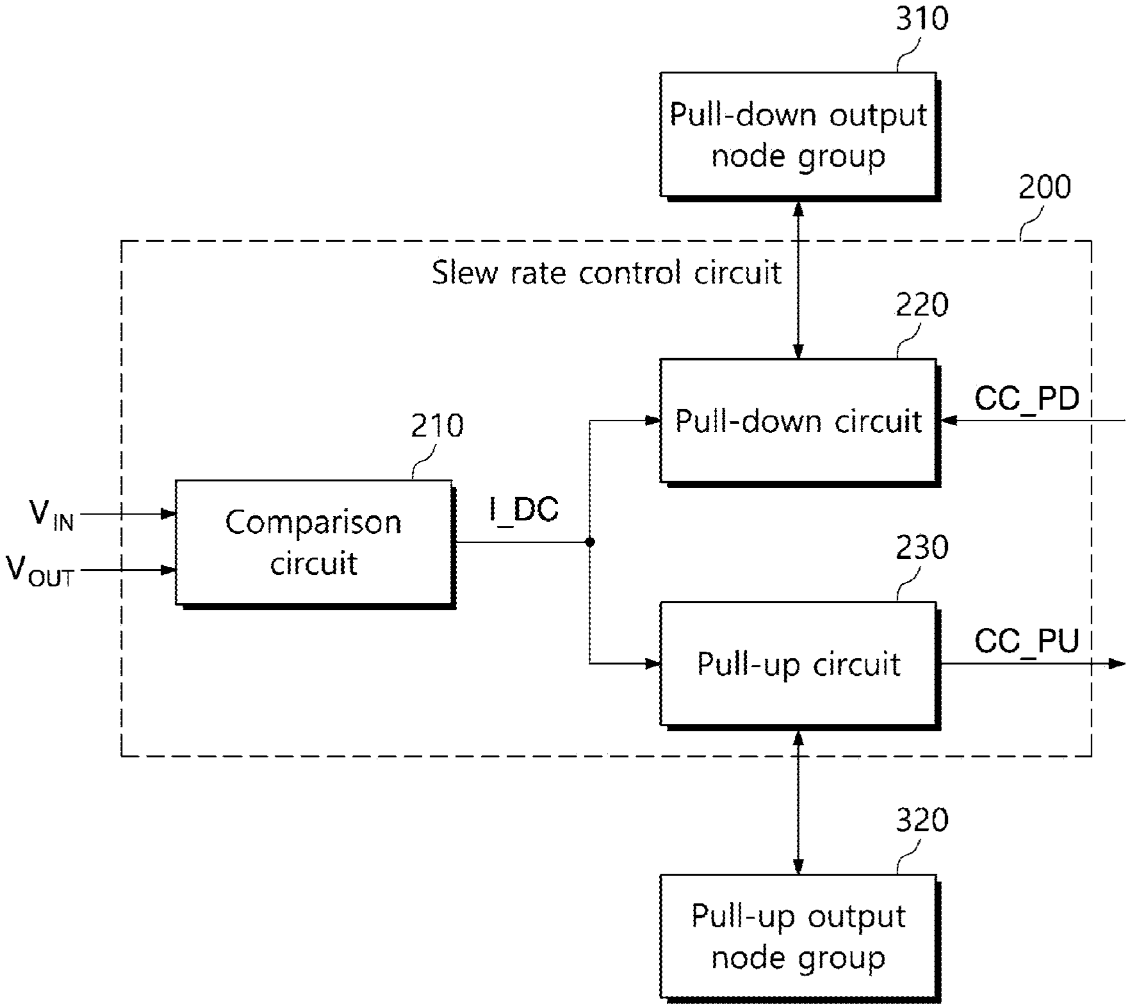
FIG. 3 is a block diagram of a slew rate control circuit in accordance with some embodiments of the disclosure.

FIG. 3 is a block diagram of a slew rate control circuit in accordance with some embodiments of the disclosure.

Referring to FIGS. 1 to 3, the slew rate control circuit 200 may include a comparison circuit 210, a pull-down circuit 220, and a pull-up circuit 230.

The comparison circuit 210 may generate a difference current I_DC based on the input voltage $V_{IN}$ and the output voltage $V_{OUT}$.

As some examples, the comparison circuit 210 may compare the input voltage $V_{IN}$ and the output voltage $V_{OUT}$, and generate the difference current I_DC corresponding to the difference between the input voltage $V_{IN}$ and the output voltage $V_{OUT}$.

At this time, the comparison circuit 210 may generate the difference current I_DC if the difference between the input voltage $V_{IN}$ and the output voltage $V_{OUT}$ is greater than a predetermined threshold, and activate any one of the pull-down circuit 220 and the pull-up circuit 230 via the generated difference current I_DC.

For example, the comparison circuit 210 may activate the pull-down circuit 220 if the input voltage $V_{IN}$ is greater than the output voltage $V_{OUT}$ by a predetermined threshold or more, and conversely, activate the pull-up circuit 230 if the input voltage $V_{IN}$ is smaller than the output voltage $V_{OUT}$ by a predetermined threshold or more.

The pull-down circuit 220 may generate a pull-down compensation current CC_PD by performing a current mirror operation on the difference current I_DC. At this time, whether to activate the pull-down circuit 220 may be determined according to the control of the comparison circuit 210 as described above.

The pull-down circuit 220 may include a pull-down transistor group including at least one pull-down transistor and a pull-down sub-transistor.

At this time, at least one of a plurality of pull-down transistors included in the pull-down transistor group may be directly connected to the operational amplifier 100 via any one of the pull-down output nodes included in a pull-down output node group 310.

In other words, each pull-down output node of the pull-down output node group 310 included in the display driver IC 1 may directly connect between the load stage 120 and the pull-down transistor. That is, the pull-down transistor may be directly connected to the load stage 120 via these pull-down output nodes.

The pull-up circuit 230 may generate a pull-up compensation current CC_PU by performing a current mirror operation on the difference current I_DC. At this time, whether to activate the pull-up circuit 230 may be determined according to the control of the comparison circuit 210 as described above.

The pull-up circuit 230 may include a pull-up transistor group including at least one pull-up transistor and a pull-up sub-transistor.

At this time, at least one of a plurality of pull-up transistors included in the pull-up transistor group may be directly connected to the operational amplifier 100 via any one of the pull-up output nodes included in a pull-up output node group 320.

In other words, each pull-up output node of the pull-up output node group 320 included in the display driver IC 1 may directly connect between the load stage 120 and the pull-up transistor. That is, the pull-up transistor may be directly connected to the load stage 120 via these pull-up output nodes.

As such, by having the pull-down transistor directly connected to the operational amplifier 100 via the pull-down output node or having the pull-up transistor directly connected to the operational amplifier 100 via the pull-up output node, the display driver IC 1 of the disclosure can improve the slew rate more quickly.

In the following, a circuit diagram of the display driver IC 1 and detailed circuit diagrams of each component of the display driver IC 1 of the disclosure will be described with reference to FIGS. 4 to 8.

Figure 4:
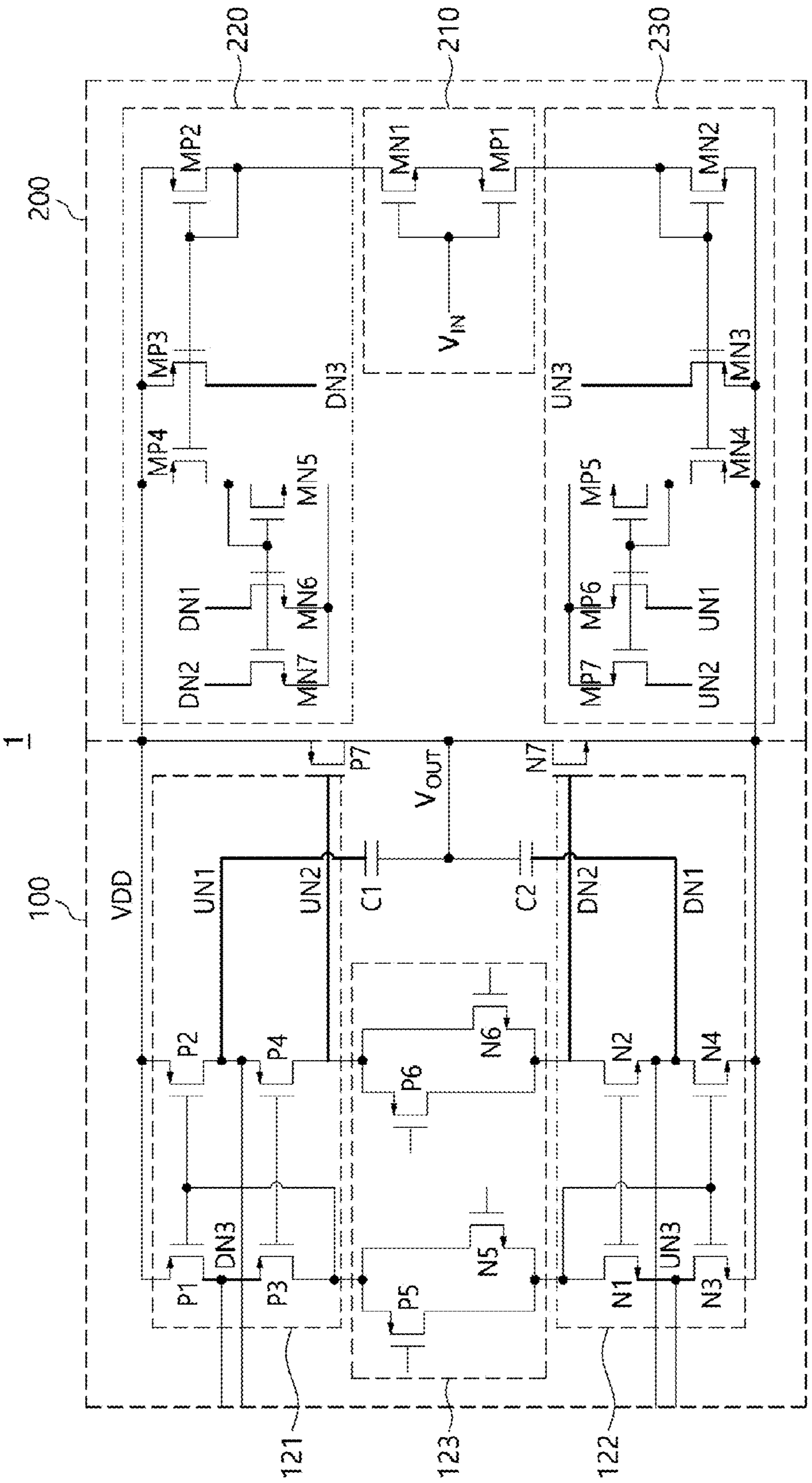
FIG. 4 is a circuit diagram of a display driver IC in accordance with some embodiments of the disclosure.
Figure 5:
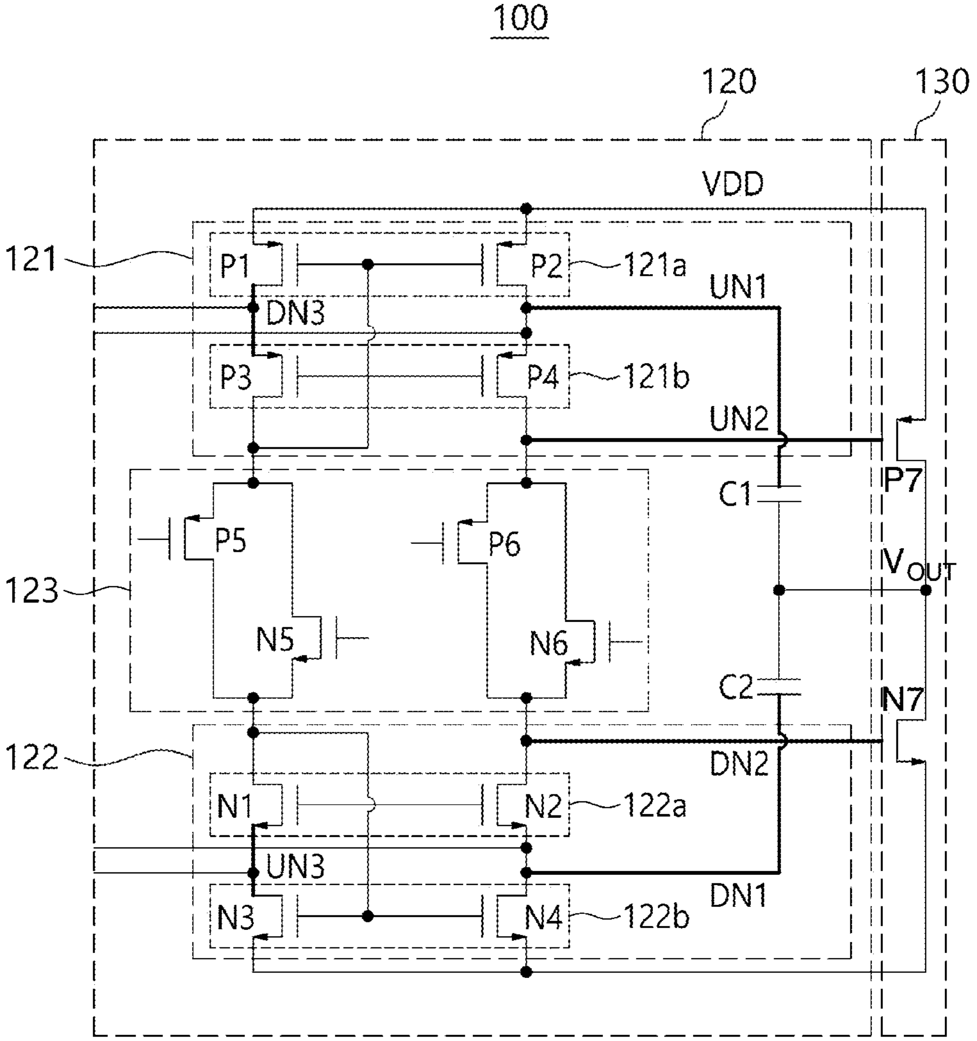
FIG. 5 is a detailed circuit diagram of an operational amplifier in accordance with some embodiments of the disclosure.
Figure 6:
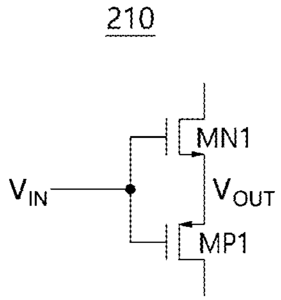
FIG. 6 is a detailed circuit diagram of a comparison circuit in accordance with some embodiments of the disclosure.
Figure 7:
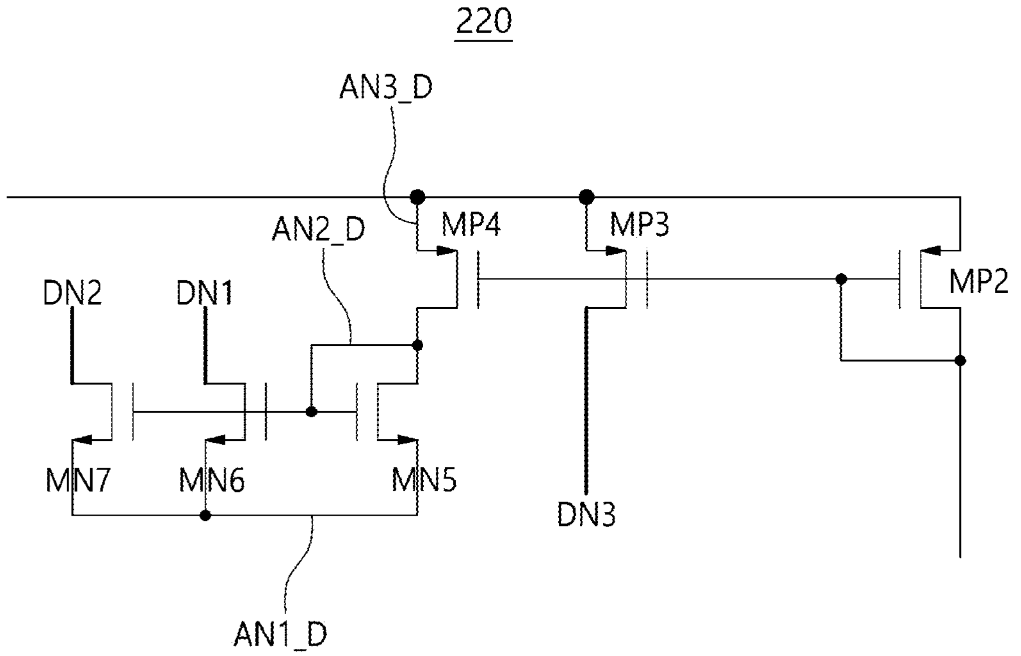
FIG. 7 is a detailed circuit diagram of a pull-down circuit in accordance with some embodiments of the disclosure.
Figure 8:
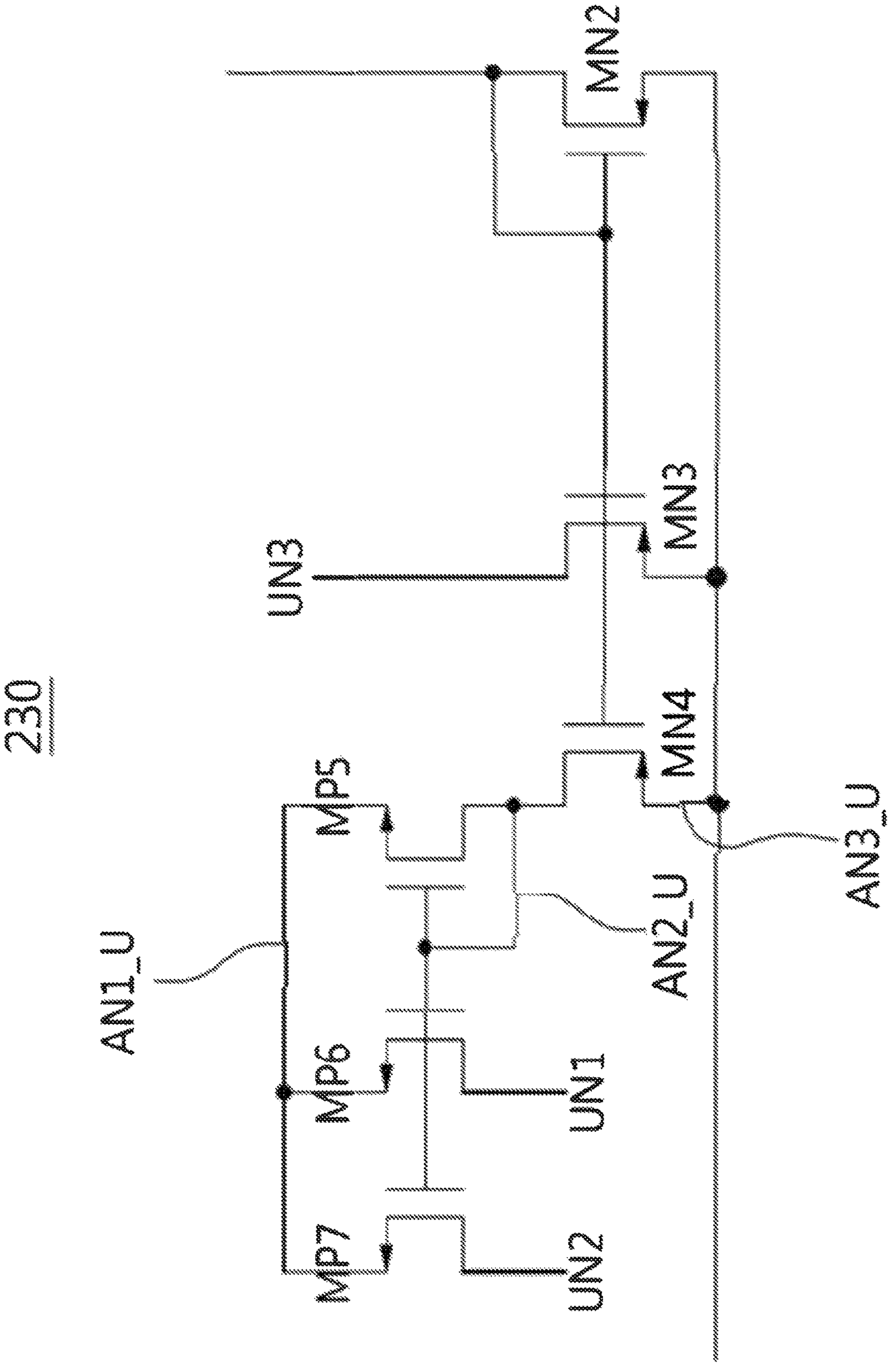
FIG. 8 is a detailed circuit diagram of a pull-up circuit in accordance with some embodiments of the disclosure.

FIG. 4 is a circuit diagram of a display driver IC in accordance with some embodiments of the disclosure. FIG. 5 is a detailed circuit diagram of an operational amplifier in accordance with some embodiments of the disclosure. FIG. 6 is a detailed circuit diagram of a comparison circuit in accordance with some embodiments of the disclosure. FIG. 7 is a detailed circuit diagram of a pull-down circuit in accordance with some embodiments of the disclosure. FIG. 8 is a detailed circuit diagram of a pull-up circuit in accordance with some embodiments of the disclosure.

Referring to FIGS. 4 to 8, the display driver IC 1 may include the operational amplifier 100 and the slew rate control circuit 200, as described above.

As described above, the operational amplifier 100 may include the load stage 120 and the output stage 130. Although FIGS. 4 to 8 show only the load stage 120 and the output stage 130, which are parts of the operational amplifier 100, for the convenience of description, the operational amplifier 100 may, of course, include the input stage, the bias circuit, and the like, as described above.

The load stage 120 may include an upper circuit 121, a lower circuit 122, a connection circuit 123, capacitors C1 and C2, and the like.

The upper circuit 121 may include upper current mirror circuits **121*a* and 121*b***.

The upper current mirror circuits **121*a* and 121*b* may include PMOS transistors P1 and P2, and P3 and P4 connected in a current mirror form. In this case, the upper current mirror circuits 121*a* and 121*b* may include a first upper current mirror circuit 121*a* and a second upper current mirror circuit 121*b*. The first upper current mirror circuit 121*a* may include the PMOS transistors P1 and P2 connected in a current mirror form, and the second upper current mirror circuit 121*b* may include the PMOS transistors P3 and P4** connected in a current mirror form.

The upper circuit 121 may be electrically connected to a second input stage included in the input stage (110 in FIG. 2) and supply current to the load stage 120.

The lower circuit 122 may include lower current mirror circuits 122*a* and 122*b*.

The lower current mirror circuits 122*a* and 122*b* may include NMOS transistors N1 and N2, and N3 and N4 connected in a current mirror form. In this case, the lower current mirror circuits 122*a* and 122*b* may include a first lower current mirror circuit 122*a* and a second lower current mirror circuit 122*b*. The first lower current mirror circuit 122*a* may include the NMOS transistors N1 and N2 connected in a current mirror form, and the second lower current mirror circuit 122*b* may include the NMOS transistors N3 and N4 connected in a current mirror form.

The lower circuit 122 may be electrically connected to a first input stage included in the input stage (110 in FIG. 2) and supply current to the load stage 120.

The connection circuit 123 may serve to electrically connect the upper circuit 121 and the lower circuit 122. In this case, the connection circuit 123 may include at least one PMOS transistor P5 and P6 and NMOS transistor N5 and N6 that operate in response to the bias voltage. At this time, the PMOS transistors P5 and P6 and the NMOS transistors N5 and N6 included in the connection circuit may operate in response to different bias voltages.

The capacitors C1 and C2 may serve to electrically connect the upper circuit 121 and the output stage 130 and/or the lower circuit 122 and the output stage 130.

Meanwhile, the load stage 120 may be directly connected to the slew rate control circuit 200 via the pull-down output nodes DN1 to DN3 and/or the pull-up output nodes UN1 to UN3.

The output stage 130 may be electrically connected to the load stage 120 and may output the output voltage $V_{OUT}$.

As some examples, the output stage 130 may include at least one transistor P7, N7. At this time, the gate electrode of the PMOS transistor P7 included in the output stage 130 may be connected to the upper circuit 121 of the load stage 120, and the gate electrode of the NMOS transistor N7 included in the output stage 130 may be connected to the lower circuit 122 of the load stage 120.

The slew rate control circuit 200 may include a comparison circuit 210, a pull-down circuit 220, and a pull-up circuit 230.

The comparison circuit 210 may generate a difference current based on the input voltage $V_{IN}$ and the output voltage $V_{OUT}$.

The comparison circuit 210 may include an NMOS transistor MN1 and a PMOS transistor MP1. The NMOS transistor MN1 may include a gate electrode to which the input voltage $V_{IN}$ is applied, a source electrode to which the output voltage $V_{OUT}$ is applied, and a drain electrode connected to the pull-down circuit 220. The PMOS transistor MP1 may include a gate electrode to which the input voltage $V_{IN}$ is applied, a source electrode to which the output voltage $V_{OUT}$ is applied, and a drain electrode connected to the pull-up circuit 230.

As some examples, the comparison circuit 210 may compare the input voltage $V_{IN}$ and the output voltage $V_{OUT}$, and generate the difference current corresponding to the difference between the input voltage $V_{IN}$ and the output voltage $V_{OUT}$.

The comparison circuit 210 may generate the difference current if the difference between the input voltage $V_{IN}$ and the output voltage $V_{OUT}$ is greater than a predetermined threshold, and activate any one of the pull-down circuit 220 and the pull-up circuit 230 via the generated difference current.

For example, the comparison circuit 210 may activate the pull-down circuit 220 if the input voltage $V_{IN}$ is greater than the output voltage $V_{OUT}$ by a predetermined threshold or more, and conversely, activate the pull-up circuit 230 if the input voltage $V_{IN}$ is smaller than the output voltage $V_{OUT}$ by a predetermined threshold or more.

The pull-down circuit 220 may generate a pull-down compensation current by performing a current mirror operation on the difference current. At this time, whether to activate the pull-down circuit 220 may be determined according to the control of the comparison circuit 210 as described above.

The pull-down circuit 220 may include a pull-down transistor group including pull-down transistors MN6, MN7, and MP3 connected to pull-down output nodes DN1 to DN3 and pull-down sub-transistors MN5, MP4, MP2, and pull-down auxiliary nodes AN1_D to AN3_D.

If described specifically, the pull-down circuit 220 may include a pull-down transistor group including a first pull-down transistor MN6, a second pull-down transistor MN7, a third pull-down transistor MP3, a first pull-down sub-transistor MN5, a second pull-down sub-transistor MP4, and a third pull-down sub-transistor MP2.

The drain electrode of the first pull-down transistor MN6 may be connected to a first pull-down output node DN1 connected to the operational amplifier 100, the source electrode may be connected to a first pull-down auxiliary node AN1_D included in the pull-down circuit 220, and the gate electrode may be connected to a second pull-down auxiliary node AN2_D included in the pull-down circuit 220.

The drain electrode of the second pull-down transistor MN7 may be connected to a second pull-down output node DN2 connected to the operational amplifier 100, the source electrode may be connected to the first pull-down auxiliary node AN1_D, and the gate electrode may be connected to the first pull-down transistor MN6.

The drain electrode of the third pull-down transistor MP3 may be connected to a third pull-down output node DN3 connected to the operational amplifier, the source electrode may be connected to a third pull-down auxiliary node AN3_D, and the gate electrode may be connected to the second pull-down sub-transistor MP4.

The drain and gate electrodes of the first pull-down sub-transistor MN5 may be connected to the second pull-down auxiliary node AN2_D, and the source electrode may be connected to the first pull-down auxiliary node AN1_D.

The drain electrode of the second pull-down sub-transistor MP4 may be connected to the second pull-down auxiliary node AN2_D, the source electrode may be connected to the third pull-down auxiliary node AN3_D, and the gate electrode may be connected to the third pull-down transistor MP3.

The source electrode of the third pull-down sub-transistor MP2 may be connected to the third pull-down auxiliary node AN3_D, the gate electrode may be connected to the third pull-down transistor MP3, and the drain electrode may be connected to the comparison circuit 210.

The pull-up circuit 230 may generate a pull-up compensation current CC_PU by performing a current mirror operation on the difference current I_DC. At this time, whether to activate the pull-up circuit 230 may be determined according to the control of the comparison circuit 210 as described above.

The pull-up circuit 230 may include a pull-up transistor group including pull-up transistors MP6, MP7, and MN3 connected to pull-up output nodes UN1 to UN3 and pull-up sub-transistors MP5, MN4, and MN2, and pull-up auxiliary nodes AN1_U to AN3_U.

If described specifically, the pull-up circuit 230 may include a pull-up transistor group including a first pull-up transistor MP6, a second pull-up transistor MP7, a third pull-up transistor MN3, a first pull-up sub-transistor MP5, a second pull-up sub-transistor MN4, and a third pull-up sub-transistor MN2.

The drain electrode of the first pull-up transistor MP6 may be connected to a first pull-up output node UN1 connected to the operational amplifier 100, the source electrode may be connected to a first pull-up auxiliary node AN1_U included in the pull-up circuit 230, and the gate electrode may be connected to a second pull-up auxiliary node AN2_U included in the pull-up circuit 230.

The drain electrode of the second pull-up transistor MP7 may be connected to a second pull-up output node UN2 connected to the operational amplifier 100, the source electrode may be connected to the first pull-up auxiliary node AN1_U, and the gate electrode may be connected to the first pull-up transistor MP6.

The drain electrode of the third pull-up transistor MN3 may be connected to a third pull-up output node UN3 connected to the operational amplifier, the source electrode may be connected to a third pull-up auxiliary node AN3_U, and the gate electrode may be connected to the second pull-up sub-transistor MN4.

The drain and gate electrodes of the first pull-up sub-transistor MP5 may be connected to the second pull-up auxiliary node AN2_U, and the source electrode may be connected to the first pull-up auxiliary node AN1_U.

The drain electrode of the second pull-up sub-transistor MN4 may be connected to the second pull-up auxiliary node AN2_U, the source electrode may be connected to the third pull-up auxiliary node AN3_U, and the gate electrode may be connected to the third pull-up transistor MN3.

The source electrode of the third pull-up sub-transistor MN2 may be connected to the third pull-up auxiliary node AN3_U, the gate electrode may be connected to the third pull-up transistor MN3, and the drain electrode may be connected to the comparison circuit 210.

The pull-up output nodes UN1 to UN3 and/or the pull-down output nodes DN1 to DN3 may directly connect the load stage 120 and the slew rate control circuit 200.

In order to show that the pull-up output nodes UN1 to UN3 and/or the pull-down output nodes DN1 to DN3 directly connect the operational amplifier 100 and the slew rate control circuit 200, FIGS. 4 to 8 illustrate that the pull-up output nodes UN1 to UN3 and/or the pull-down output nodes DN1 to DN3 are included in both the operational amplifier 100 and the slew rate control circuit 200, respectively. If described by way of example, in order to show that the first pull-down output node DN1 connects between the first pull-down transistor MN6 and the first lower current mirror circuit 122*a* and the second lower current mirror circuit 122*b*, FIGS. 4 to 8 illustrate that the first pull-down output node DN1 is included in the operational amplifier 100 and the slew rate control circuit 200, respectively.

As some examples, the pull-up output nodes UN1 to UN3 and/or the pull-down output nodes DN1 to DN3 may serve to directly connect the pull-up transistors MP6, MP7, and MN3 included in the pull-up transistor group of the slew rate control circuit 200 and/or the pull-down transistors MN6, MN7, and MP3 included in the pull-down transistor group and the load stage 120.

If described specifically, the first pull-down output node DN1 may serve to connect the first pull-down transistor MN6 included in the pull-down transistor group and the lower circuit 122 of the load stage 120. At this time, the first pull-down output node DN1 may connect between the first pull-down transistor MN6, and the first lower current mirror circuit 122*a* and the second lower current mirror circuit 122*b*.

The second pull-down output node DN2 may serve to connect the second pull-down transistor MN7 included in the pull-down transistor group and the lower circuit 122 of the load stage 120. At this time, the second pull-down output node DN2 may connect between the second pull-down transistor MN7, and the second lower current mirror circuit 122*b* and the connection circuit 123.

The third pull-down output node DN3 may serve to connect the third pull-down transistor MP3 included in the pull-down transistor group and the upper circuit 121. At this time, the third pull-down output node DN3 may be connected to the third pull-down transistor MP3, the first upper current mirror circuit 121*a*, and the second upper current mirror circuit 121*b*, respectively. Specifically, the third pull-down output node DN3 may be connected to the third pull-down transistor MP3, the drain electrode of the PMOS transistor P1 of the first upper current mirror circuit 121*a*, and the source electrode of the PMOS transistor P3 of the second upper current mirror circuit 121*b*, respectively.

The first pull-up output node UN1 may serve to connect the first pull-up transistor MP6 included in the pull-up transistor group and the upper circuit 121 of the load stage 120. At this time, the first pull-up output node UN1 may connect between the first pull-up transistor MP6, and the first upper current mirror circuit 121*a* and the second upper current mirror circuit 121*b*.

The second pull-up output node UN2 may serve to connect the second pull-up transistor MP7 included in the pull-up transistor group and the upper circuit 121 of the load stage 120. At this time, the second pull-up output node UN2 may connect between the second pull-up transistor MP7, and the second upper current mirror circuit 121*b* and the connection circuit 123.

The third pull-up output node UN3 may serve to connect the third pull-up transistor MN3 included in the pull-up transistor group and the lower circuit 122. At this time, the third pull-up output node UN3 may be connected to the third pull-up transistor MN3, the first lower current mirror circuit 122*a*, and the second lower current mirror circuit 122*b*, respectively. In detail, the third pull-up output node UN3 may be connected to the third pull-up transistor MN3, the source electrode of the NMOS transistor N1 of the first lower current mirror circuit 122*a*, and the drain electrode of the NMOS transistor N3 of the second lower current mirror circuit 122*b*, respectively.

In this case, the third pull-up output node UN3 and the third pull-down output node DN3 may be connected to the operational amplifier 100 at a location farther apart than the first pull-up output node UN1, the second pull-up output node UN2, the first pull-down output node DN1, and the second pull-down output node DN2 based on the slew rate control circuit 200.

In other words, the location on the circuit where the third pull-up output node UN3 and the third pull-down output node DN3 are connected to the operational amplifier 100 may be a location farther apart than the first pull-up output node UN1, the second pull-up output node UN2, the first pull-down output node DN1, and the second pull-down output node DN2 based on the slew rate control circuit 200.

By having the circuit configuration described above in FIGS. 4 to 8, the display driver IC 1 of the disclosure can effectively increase the slew rate of the output voltage $V_{OUT}$. In the following, the process by which the slew rate of the output voltage $V_{OUT}$ of the display driver IC 1 is increased through the circuit configuration described above will be described.

First, if the magnitude of the input voltage $V_{IN}$ gets greater than the magnitude of the output voltage $V_{OUT}$ by a threshold or more, the NMOS transistor MN1 included in the comparison circuit 210 is turned on, the PMOS transistor MP1 is turned off, and the pull-down circuit 220 is activated. In this case, the threshold may mean the threshold voltage of the MOS transistor.

Next, a current path from the third pull-down sub-transistor MP2 to the NMOS transistor MN1 of the comparison circuit 210 is formed. The current is copied in order of the third pull-down transistor MP3, the second pull-down sub-transistor MP4, the first pull-down sub-transistor MN5, the first pull-down transistor MN6, and the second pull-down transistor MN7.

At this time, since the drain electrode of the first pull-down transistor MN6 is connected to the first pull-down output node DN1, the slew rate of the output voltage $V_{OUT}$ is increased.

In other words, since the drain electrode of the first pull-down transistor MN6 is connected to the first pull-down output node DN1, the voltage at the first pull-down output node DN1 is decreased, the gate voltage at the pull-down driver is decreased accordingly to form a pull-down path, and since the gate potential of the pull-up driver also drops rapidly, the slew rate of the output voltage $V_{OUT}$ is increased.

Further, since the drain electrode of the second pull-down transistor MN7 is connected to the second pull-down output node DN2, the slew rate of the output voltage $V_{OUT}$ is increased more effectively.

In other words, since the drain electrode of the second pull-down transistor MN7 is connected to the second pull-down output node DN2 connected to the gate electrode of the NMOS transistor N7 of the output stage 130, the slew rate can be increased more effectively.

In addition, since the drain electrode of the third pull-down transistor MP3 is connected to the third pull-down output node DN3, delays for a settling operation can be prevented from occurring.

In other words, since the drain electrode of the third pull-down transistor MP3 is connected to the third pull-down output node DN3, it operates to raise the gate voltage of the transistors P1 and P2 of the first upper current mirror circuit 121*a* of the operational amplifier 100. At this time, the current in the transistors P1 and P2 decreases, and accordingly, it operates so as to be able to quickly lower the gate voltage of the pull-up driver. In addition, the current introduced by the third pull-down transistor MP3 increases the current of the transistor N3, thereby further increasing the current of the transistor N4. As this operation occurs after the operations of the first pull-down transistor MN6 and the second pull-down transistor MN7, it is possible to improve the existing problem of settling delays, and there is no additional current consumption occurring as well.

Next, if the input voltage $V_{IN}$ is smaller than the output voltage $V_{OUT}$ by a threshold or more, a falling slew boost process proceeds in a manner similar to the method described above, thereby increasing the slew rate. A detailed description thereof will be omitted.

Figure 9:
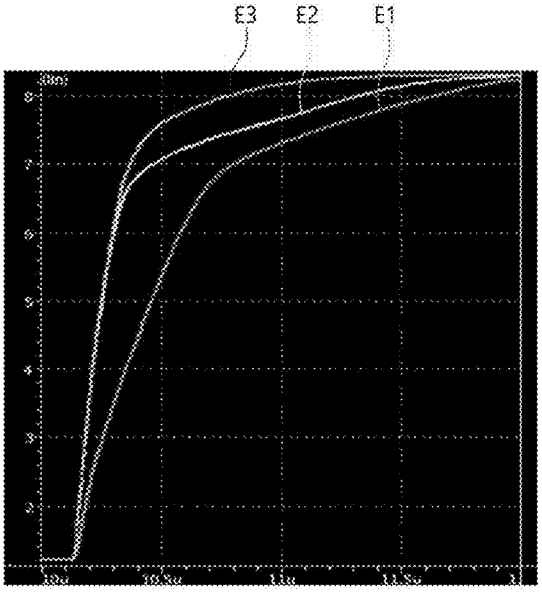
FIG. 9 is a diagram for describing a slew rate improvement effect in accordance with some embodiments of the disclosure.
Figure 9:
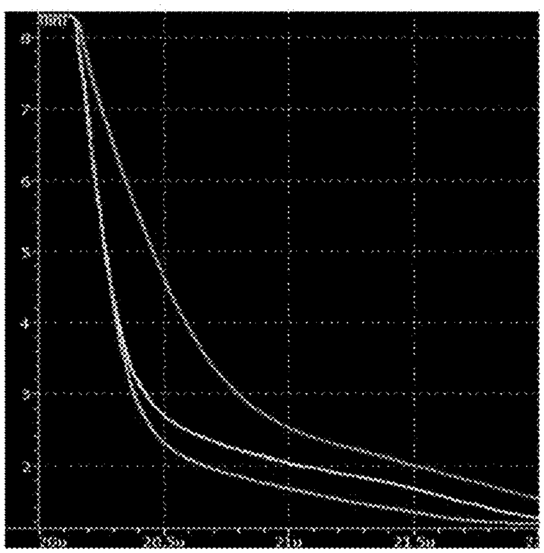

FIG. 9 is a diagram for describing a slew rate improvement effect in accordance with some embodiments of the disclosure.

Referring to FIG. 9, FIG. 9 shows experimental results obtained by measuring a voltage increase or decrease over time by varying the circuit configuration. In FIG. 9, the x-axis represents time, and the y-axis represents voltage.

Specifically, E1 shows experimental results when the nodes that directly connect the operational amplifier and the slew rate control circuit are the first pull-down output node and the first pull-up output node, E2 shows experimental results when the nodes that directly connect the operational amplifier and the slew rate control circuit are the first and second pull-down output nodes and the first and second pull-up output nodes, and E3 shows experimental results when the nodes that directly connect the operational amplifier and the slew rate control circuit are the first to third pull-down output nodes and the first to third pull-up output nodes.

That is, the experimental result for the display driver IC of the disclosure is shown by E3.

Referring to FIG. 9, it can be confirmed that the slew rate of E2 is higher than that of E1, and the slew rate of E3 is higher than that of E2. That is, it can be confirmed that the slew rate is increased significantly via the display driver IC of the disclosure.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A display driver integrated circuit comprising:

an operational amplifier configured to amplify an input voltage and generate an output voltage; and a slew rate control circuit configured to generate a compensation current based on a difference between the input voltage and the output voltage and provide the generated compensation current to the operational amplifier, wherein the slew rate control circuit comprises:

a comparison circuit configured to compare the input voltage and the output voltage and generate a difference current corresponding to a difference between the input voltage and the output voltage;

a pull-down circuit comprising a pull-down transistor group and configured to generate a pull-down compensation current by current-mirroring the generated difference current; and a pull-up circuit comprising a pull-up transistor group and configured to generate a pull-up compensation current by current-mirroring the generated difference current, and wherein a first pull-down transistor included in the pull-down transistor group is directly connected to the operational amplifier via a first pull-down output node, and a second pull-down transistor included in the pull-down transistor group and different from the first pull-down transistor is directly connected to the operational amplifier via a second pull-down output node that is different from the first pull-down output node, and a first pull-up transistor included in the pull-up transistor group is directly connected to the operational amplifier via a first pull-up output node, and a second pull-up transistor included in the pull-up transistor group and different from the first pull-up transistor is directly connected to the operational amplifier via a second pull-up output node that is different from the first pull-up output node node;

wherein the operational amplifier comprises an upper circuit, a lower circuit, and a connection circuit connecting the upper circuit and the lower circuit;

wherein the upper circuit comprises a first upper current mirror circuit and a second upper current mirror circuit, and is connected to the first pull-up output node and the second pull-up output node, and the lower circuit comprises a first lower current mirror circuit and a second lower current mirror circuit, and is connected to the first pull-down output node and the second pull-down output node;

wherein the first pull-up output node is connected between the first upper current mirror circuit and the second upper current mirror circuit, the second pull-up output node is connected between the second upper current mirror circuit and the connection circuit, the first pull-down output node is connected between the first lower current mirror circuit and the second lower current mirror circuit, and the second pull-down output node is connected between the first lower current mirror circuit and the connection, wherein a third pull-down transistor included in the pull-down transistor group and different from the first pull-down transistor and the second pull-down transistor is directly connected to the upper circuit of the operational amplifier via a third pull-down output node, and a third pull-up transistor included in the pull-up transistor group and different from the first pull-up transistor and the second pull-up transistor is directly connected to the lower circuit of the operational amplifier via a third pull-up output node.

2. The display driver integrated circuit of claim 1, wherein the third pull-up output node is connected between the first lower current mirror circuit and the second lower current mirror circuit, respectively, and the third pull-down output node is connected to the first upper current mirror circuit and the second upper current mirror circuit, respectively.

3. The display driver integrated circuit of claim 2, wherein the third pull-up output node and the third pull-down output node are connected to the operational amplifier at a location farther apart than the first pull-up output node, the second pull-up output node, the first pull-down output node, and the second pull-down output node based on the slew rate control circuit.

* * * * *